United States Patent
Long, II et al.

(10) Patent No.: US 7,399,146 B2
(45) Date of Patent: Jul. 15, 2008

(54) ROTARY CUTTING TOOL HAVING IRREGULAR INSERT ORIENTATION

(75) Inventors: Thomas J. Long, II, Greensburg, PA (US); Karen A. Craig, Greensburg, PA (US); Ronald L. Dudzinsky, Derry, PA (US); Ruy Frota de Souza, Filho, Latrobe, PA (US); Nicholas M. Gaten, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 445 days.

(21) Appl. No.: 10/673,306

(22) Filed: Sep. 29, 2003

(65) Prior Publication Data

US 2005/0084341 A1    Apr. 21, 2005

(51) Int. Cl.
B23C 5/20    (2006.01)
(52) U.S. Cl. .............................. 407/33; 407/56; 407/58
(58) Field of Classification Search .................. 407/31, 407/40, 47, 33, 56, 59, 58, 61, 63, 53, 66, 407/67
See application file for complete search history.

(56) References Cited

U.S. PATENT DOCUMENTS

| | | | |
|---|---|---|---|
| 4,092,082 A | 5/1978 | Severson | |
| 4,093,392 A | 6/1978 | Hopkins | |
| 4,302,135 A * | 11/1981 | Lillie | 408/59 |
| 4,844,666 A | 7/1989 | Tsujimura et al. | |
| 5,800,098 A * | 9/1998 | Satran et al. | 407/31 |
| 5,913,644 A | 6/1999 | DeRoche et al. | |
| 5,947,649 A * | 9/1999 | Arai et al. | 407/34 |

OTHER PUBLICATIONS

Twincut 45 Degree "Advantage", Ad, Leitz Metalworking Technology Group, Printed Oct. 27, 2003, 2 pages.

* cited by examiner

*Primary Examiner*—Willmon Fridie, Jr.
(74) *Attorney, Agent, or Firm*—Larry R. Meenan

(57) ABSTRACT

A rotary cutting tool such as a helical end mill, having pockets arranged to overcome harmonic vibrations. The tool has at least two and in one embodiment all three of three spacing irregularities. In the first irregularity, columns of pockets, typically associated with flutes, are staggered circumferentially out of even spacing. In a preferred embodiment having three flutes, the flutes are mostly not centered on one hundred twenty degree intervals. In the second irregularity, at least some pockets are arranged at different radial rake angles. In the third irregularity, at least some pockets are arranged at different axial rake angles.

20 Claims, 5 Drawing Sheets

ROTARY CUTTING TOOL HAVING IRREGULAR INSERT ORIENTATION

BACKGROUND OF THE INVENTION

1. Field of the Invention

The present invention relates to machine tools for shaping a work piece, and more particularly to rotatable tools of the type provided with cutting inserts. Orientation of inserts on the tool is varied to avoid repetitive orientation which may promote vibrational harmonics during operation.

2. Description of the Related Art

Machining work pieces by rotary cutting tools may cause objectionable vibrational harmonics to occur. This results in chatter and other phenomena which may cause flaws in the machined product. It is not desirable to alter rotational speeds of a machine tool and rate of advance speeds of a cutting tool as such steps may interfere with optimal productivity. It is known to vary circumferential spacing of inserts and their pockets in a rotary cutting tool to break up harmonics which might otherwise occur. This approach is shown in U.S. Pat. Nos. 4,092,082, issued on May 30, 1978, to Severson. It is also known to vary rake angles among inserts, as shown in U.S. Pat. No. 4,844,666, issued on Jul. 4, 1989, to Tsujimura et al., and 5,913,644, issued on Jun. 22, 1999, to DeRoche et al., of common ownership with the present application. The prior art does not show or suggest the novel combinations of insert orientation within a rotary cutting tool as claimed.

SUMMARY OF THE INVENTION

The present invention advances the art over prior known designs by introducing, in a rotary cutting tool on which cutting inserts are installed, irregularities of orientation of those inserts within a tool. Inserts may be varied in their circumferential spacing about the periphery of a cutting tool such as an end mill. Also, axial and radial rake angles of inserts may be varied from those of other inserts disposed about the peripheral face of the cutting tool.

In one embodiment of the invention, a rotary cutting tool displays both variable or irregular circumferential spacing of pockets about the peripheral face of the cutting tool, and also differing or variable rake angles among some inserts. The differing rake angles may be of axial rake, radial rake, or both.

In another embodiment of the invention, a rotary cutting tool has both variable axial rake and also variable radial rack angles among some inserts, but does not display variation in circumferential spacing.

It is, therefore, a feature of the invention to overcome harmonic vibration by varying orientation of pockets and of associated inserts within a rotary cutting tool using inserts.

In particular, it is a feature to combine different categories of variable orientation of inserts within a cutting tool.

It is a feature of the invention to provide improved elements and arrangements thereof by apparatus for the purposes described which is inexpensive, dependable, and fully effective in accomplishing its intended purposes.

These and other features of the present invention will become readily apparent upon further review of the following specification and drawings.

BRIEF DESCRIPTION OF THE DRAWINGS

Various features and attendant advantages of the present invention will become more fully appreciated, as the same becomes better understood when considered in conjunction with the accompanying drawings, wherein.

DESCRIPTION OF THE PREFERRED EMBODIMENT

Figure 1:
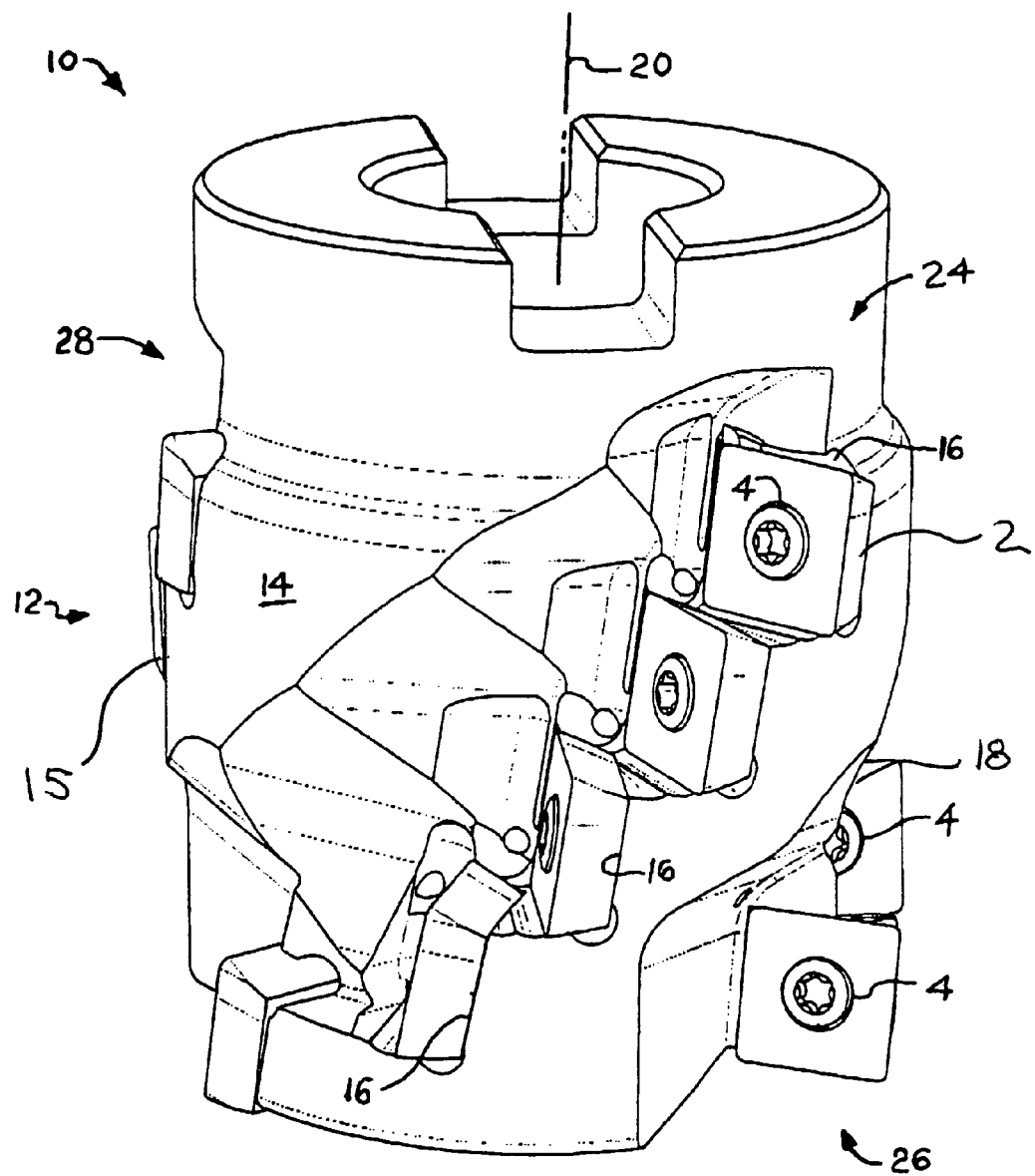
FIG. 1 is a top perspective view of a rotary cutting tool according to the present invention, showing cutting inserts installed thereon.

Referring to the Drawings, wherein like reference characters represent like elements throughout the various Figures, FIG. 1 shows a rotary cutting tool 10 in accordance with the present invention. Tool 10 comprises a body 12 having a circumferential face 14 bearing a plurality of pockets 16 for receiving cutting inserts 2. Circumferential face 14 is generally cylindrical and interrupted by pockets 16 and other structural features of tool 10, in the embodiment of FIG. 1. Other than their orientation on tool 10, pockets 16 are conventional, having threaded holes (not visible) for receiving screws 4 to retain inserts 2. Pockets 16 are arranged in rows, which appear horizontally arrayed when rotational axis 20 of tool 10 is vertical, as depicted in FIG. 1, and columns. Rotational axis 20 is disposed within circumferential face 14 of body 12.

Rows refer to pockets 16 which are generally at the same vertical level when tool 10 is vertically oriented as seen in FIG. 1. Pockets 16 of any one row are spaced apart from one another horizontally, as is typical of tools having three flutes. In some embodiments (not shown), pockets of any one row might display slight vertical offset from one another. Columns include all pockets 16 of any one of flutes 24, 26, or 28. In tools (not shown) lacking flutes, pockets arrayed substantially above one another even when there is slight rotational or angular misalignment are considered to be arrayed in columns.

One of three categories of orientational irregularity of the embodiment of FIG. 1 is that at least one pocket 16 of a selected row of flute 24 is angularly irregularly or unequally spaced from or with respect to proximity of a second pocket 15 of the same selected row but of flute 24 (or more generically stated, of a second column), and to a third pocket 16 of the same selected row but of flute 26 (or, again more generically stated, a third column).

Figure 2:
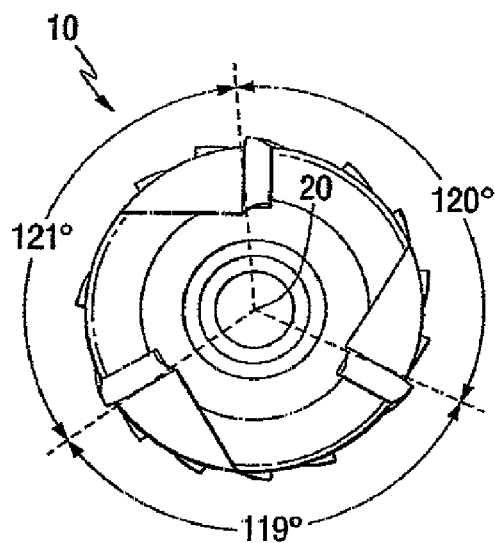
FIG. 2 is a top plan view of the tool of FIG. 1.
Figure 3:
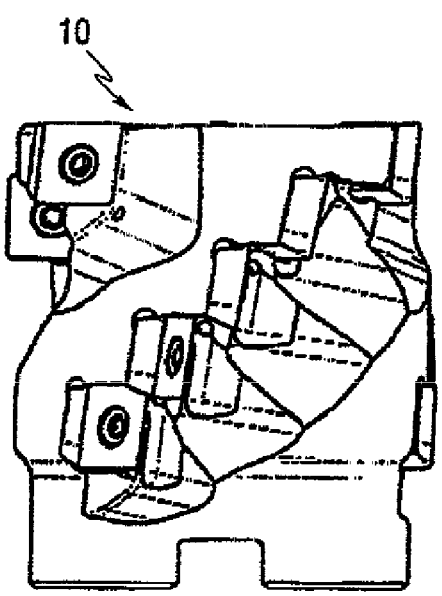
FIG. 3 is a side elevational view of the tool of FIG. 1.
Figure 4:
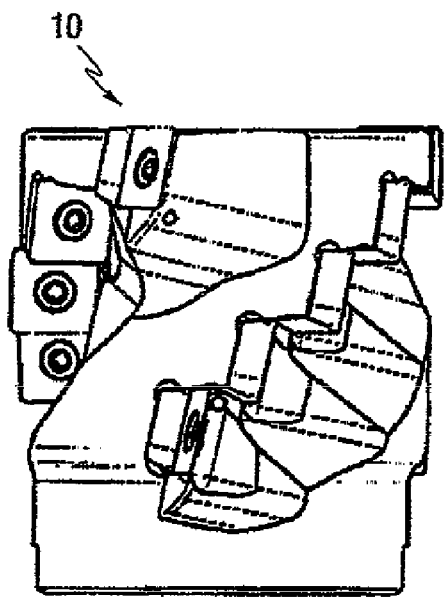
FIG. 4 is a side elevational view of the tool of FIG. 1, showing the rotary cutting tool rotated ninety degrees from the position shown in FIG. 3.

In the preferred embodiment, each pocket 16 is conventionally associated with flutes 24, 26, or 28. Therefore, it may be said that one flute 24, 26 or 28 is spaced apart from the others at irregular intervals, it necessarily following that pockets 16 and inserts 2 of any one row consequently also being irregularly spaced apart. In the embodiment of FIG. 1, there are three helical flutes 24, 26, or 28. In the first row, that being at the bottom of tool 10 as depicted in FIG. 1, flutes 24, 26, and 28 are spaced at intervals of 119 degrees, 120 degrees, and 121 degrees about the periphery of tool 10, as viewed in end elevation (for example, see FIG. 2). In the next row, spacing intervals of equal magnitude are provided, but are staggered from the first row such that pockets 16 of different flutes are spaced 120 degrees apart, compared to pockets 16 of those flutes spaced apart by 119, 120, and 121 degrees in the first row. The same principle is extended to succeeding rows of pockets 16. In the third row, spacing of flutes 24, 26, and 28 are 119.25 degrees, 120 degrees, and 120.75 degrees. In the fourth row, flute spacing is again 119 degrees, 120 degrees, and 121 degrees, but staggered from the arrangement of the first row. In the fifth row, flute spacing is 120.75 degrees, 120.75 degrees, and 118.5 degrees. Of course, other intervals may be substituted if desired, provided the spacing acts to break up harmonic vibrations.

Tool 10 also displays a second orientational irregularity, namely that at least one pocket 16 is arranged to hold an installed insert 16 at a first rake angle, and at least one other pocket 16 is arranged to hold another installed insert 16 at a different rake angle. In the embodiment of FIG. 1, both axial rake angles and radial rake angles are varied. In a currently preferred embodiment, inserts 2 in flute 24 are oriented at 12 degrees of axial rake. In the first or bottom two inserts 2 in flute 26, inserts 2 display 12 degrees of axial rake. Inserts 2 of the third, fourth, and fifth rows of flute 26 are oriented at 5 degrees of axial rake. In the first or bottom two inserts 2 in flute 28, inserts 2 display 12 degrees of axial rake. Inserts 2 of the third, fourth, and fifth rows of flute 28 are oriented at 8.5 degrees of axial rake.

Figure 2A:
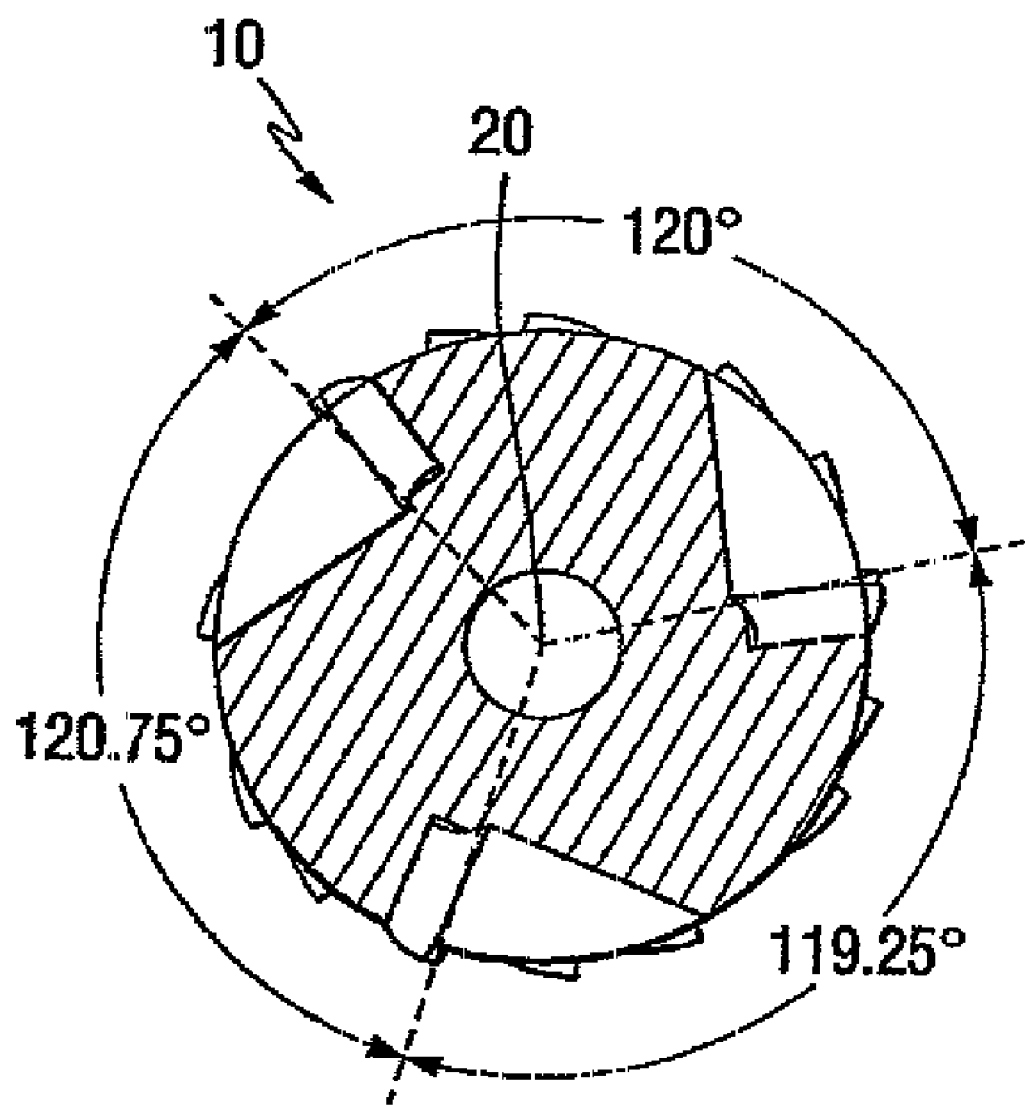
FIG. 2A is a partial cross sectional plan view of the tool of FIG. 1 along the third row of inserts.
Figure 5:
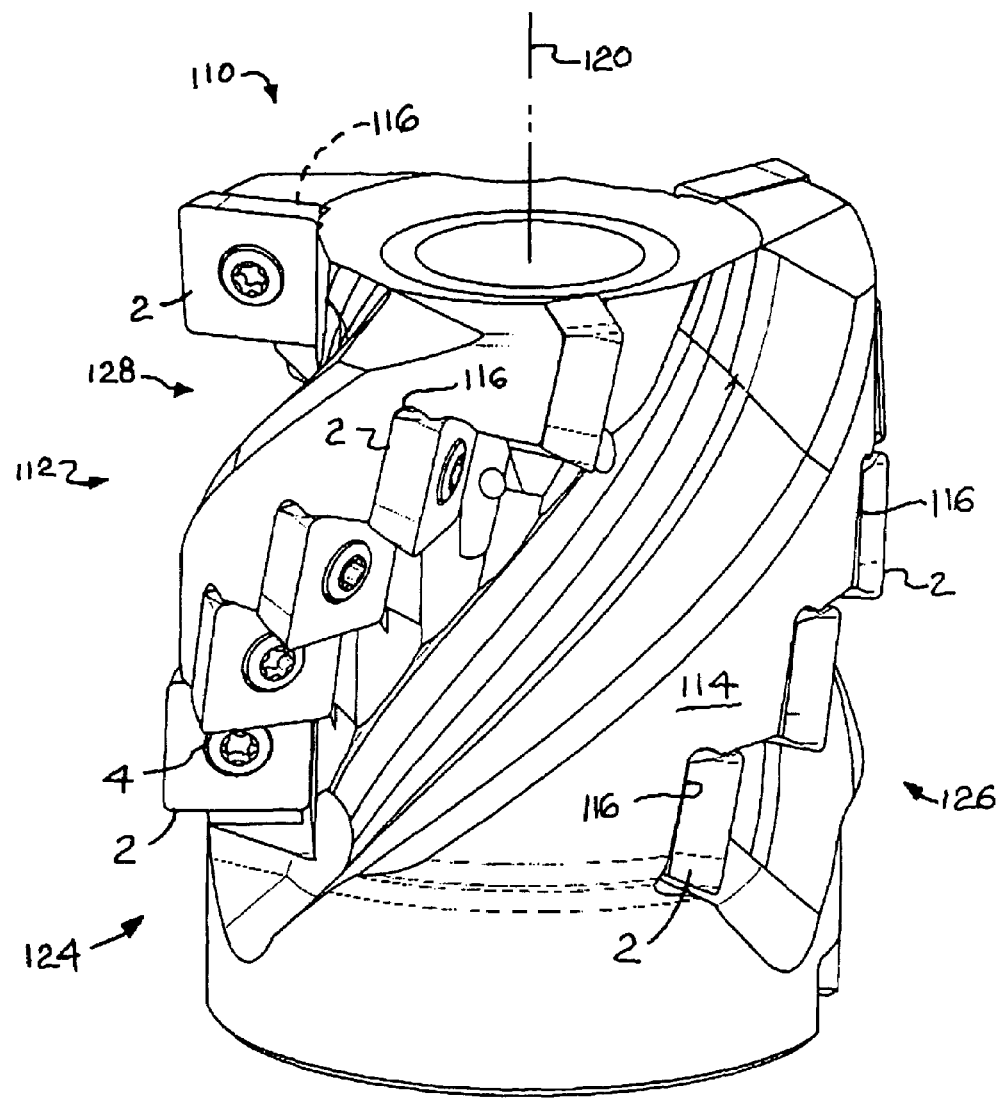
FIG. 5 is a bottom and side perspective view of another design of a rotary cutting tool according to the invention, showing cutting inserts installed thereon.
Figure 6:
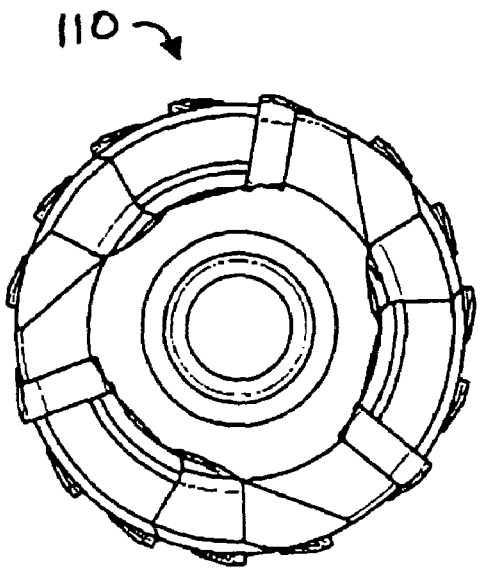
FIG. 6 is a top plan view of the tool of FIG. 5.
Figure 7:
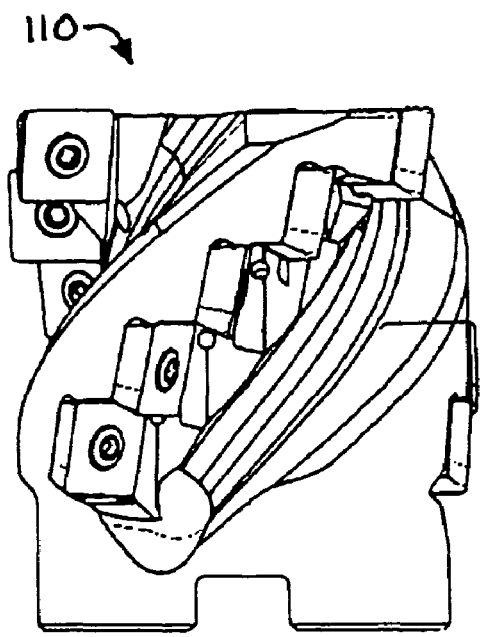
FIG. 7 is a side elevational view of the tool of FIG. 5.
Figure 8:
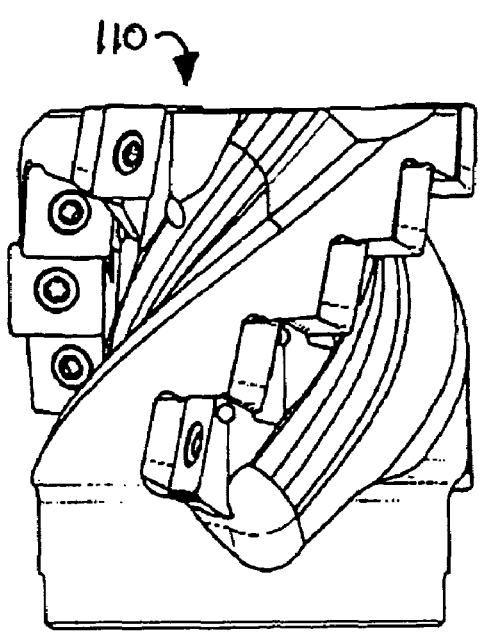
FIG. 8 is a side elevational view of the tool of FIG. 5, showing the tool rotated ninety degrees from the position shown in FIG. 7.

In the preferred embodiment, each pocket 16 is conventionally associated with flutes 24, 26, or 28. Therefore, it may be said tat one flute 24, 26 or 28 is spaced apart from the others at irregular intervals, it necessarily following that pockets 16 and inserts 2 of any one row consequently also being irregularly spaced apart. In the embodiment of FIG. 1, there are three helical flutes 24, 26, or 28. In the first row, that being at the bottom of tool 10 as depicted in FIG. 1, flutes 24, 26, and 28 are spaced at intervals of 119 degrees, 120 degrees, and 121 degrees about the periphery of tool 10, as viewed in end elevation (for example, see FIG. 2). In the next row, spacing intervals of equal magnitude are provided, but are staggered from the first row such that pockets 16 of different flutes are spaced 120 degrees apart, compared to pockets 16 of those flutes spaced apart by 120 degrees in the first row. The same principle is extended to succeeding tows of pockets 16. In the third row, spacing of flutes 24, 26, and 28 are 119.25 degrees, 120 degrees, and 120.75 degrees (for example, see FIG. 2A). In the fourth row, flute spacing is again 119 degrees, 120 degrees, and 121 degrees, but staggered from the arrangement of the first row. In the fifth row, flute spacing is 120.75 degrees, 120.75 degrees, and 118.5 degrees. Of course, other intervals may be substituted if desired, provided the spacing acts to break up harmonic vibrations Pockets 16 of the bottom or first row are lead pockets 16. It is preferred that lead pockets 16 be arranged such that their associated inserts 2 have the highest attainable axial rake, to reduce forces acting on the lead insert 2.

Tool 10 is also characterized by a third orientational irregularity of variation in radial rake angles among pockets 16. Notably, pockets 16 of the bottom two or first two rows within each flute 24, 26, or 28 are arranged to have radial rake angles of greater magnitude than those in the succeeding rows. This arrangement of radial rake angles has been found to be advantageous in smaller diameter cutting tools 10, for example, up to body diameter of two inches.

In tool 10, pockets 16 thus collectively display all three types of orientational irregularities.

Tool 10 of FIG. 1 is a helical end mill of stepped chip gash design wherein each pocket 16 is disposed to hold an installed insert 2 such that the installed insert 2 displays a clearance angle with the range of 0 to 20 degrees. Illustratively, clearance angles of 11 degrees and 15 degrees may be employed. Of course, the inventive principles may be applied to other types of tools.

FIGS. 5-8 show a tool 110 which, like tool 10, is a helical end mill, but of helical chip gash design, and has radial rake angles and axial rake angles according to the scheme of tool 10 of FIGS. 1-4. However, circumferential pocket spacing, or circumferential flute spacing is not varied, being instead 120 degrees on centers among the various flutes. In tool 110, two types of orientational irregularities are present, namely, those of axial rake angles and of radial rake angles. Tool 110 shares the basic structural features of tool 10, the former having a body 112, a circumferential face 114, pockets 116, rotational axis 120, and flutes 124, 126, and 128. However, in other embodiments (not shown), two orientational irregularities may include unequal circumferential spacing of pockets of one selected row, combined with either of variable axial rake angles and variable radial rake angles.

Rake angles described herein may vary both as to magnitude and also as to whether they are positive or negative. Positive and negative angles may be selected to suit different applications. Variation in axial rake angles and in radial rake angles may comprise variation in magnitude, variation in positive orientation and negative orientation, or both.

In cutting tools having insert pockets formed along flutes, those pockets associated with any one flute will be understood to comprise a column of pockets even though the pockets may not be arrayed one above the other with respect to the rotational axis of the tool. In the same vein, pockets of different columns which are of even orientation along the rotational axis of the tool, regardless of whether they are associated with flutes, will be understood to comprise a row.

It should be noted that in the description of the Figures, it is to be understood that terms such as "forward," "rearward," "left," "right," "upwardly," "downwardly," and the like are words of convenience and are not to be construed as limiting (apart from the invention as claimed).

The documents, patents, and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit. For example, it will be readily apparent that the invention, illustrated as pertaining to helical end mills, may be used with equal facility with other types of cutting tools, and description of the invention in relation to helical end mills is not to be construed as a limitation on the scope of the invention.

The same pockets 16 that vary in axial rake angles may be selected to also vary in radial rake angles. Alternatively, some pockets 16 may vary in axial rake angles while other pockets vary in radial rake angles. It is also possible to have some pockets vary in axial rake angles, other pockets to vary in radial rake angles, and still other pockets to vary in both axial rake angles and also in radial rake angles.

It is possible to provide a tool (not shown) according to the present invention which lacks flutes. Such a tool may instead, for example, have a chip gully or other chip disposal structure for each pocket or alternatively for several associated pockets, rather than having flutes per se.

What is claimed is:

1. A helical end mill comprising a body having a circumferential face disposed about a rotational axis bearing a plurality of pockets for receiving cutting inserts, wherein the cutting inserts are arranged in at least a first row and a second row and at least three columns on the circumferential face, wherein the angular spacing of the cutting inserts about the rotational axis within the first row varies within the row, wherein the angular spacing of the cutting inserts within the second row varies within the row, wherein angular spacing is measured in a plane perpendicular to the rotational axis.

2. The helical end mill according to claim 1, wherein at least one cutting insert is positioned at a first rake angle, and at least one other cutting insert is positioned at a different rake angle.

3. The helical end mill according to claim 2, wherein the first rake angle and the different rake angle both comprise axial rake angles.

4. The helical end mill according to claim 2, wherein the first rake angle and the different rake angle both comprise radial rake angles.

5. The helical end mill according to claim 4, wherein the lead cutting inserts of different columns display radial rake angles of greater magnitudes than the rake angles of at least some other cutting inserts.

6. The helical end mill according to claim 4, wherein lead cutting inserts of different columns and cutting inserts immediately adjacent to the lead cutting inserts have similar radial rake angles; and lead cutting inserts of different columns and cutting inserts immediately adjacent to the lead cutting inserts each display radial rake angles of greater magnitudes than the rake angles of other cutting inserts.

7. The helical end mill according to claim 1, wherein the body has helical flutes disposed thereon, and each cutting insert is associated with one of the flutes.

8. The helical end mill according to claim 1, wherein each pocket is disposed to hold an installed insert such that the insert displays a clearance angle within the range of zero to twenty degrees.

9. The helical end mill according to claim 1, wherein at least one cutting insert is positioned at a first axial rake angle, and at least one other cutting insert is positioned at a different axial rake angle; and at least one cutting insert is positioned at a first radial rake angle, and at least one other cutting insert is positioned at a different radial rake angle.

10. The helical end mill according to claim 1, wherein at least one cutting insert is positioned at a first radial rake angle, and at least one other cutting insert is positioned at a different radial rake angle, and at least one cutting insert is positioned at a first axial rake angle, and at least one other cutting insert is positioned at a different axial rake angle.

11. A helical end mill comprising a body having a circumferential face disposed about a rotational axis bearing a plurality of pockets for receiving cutting inserts, wherein the cutting inserts are arranged in at least a first row and a second row and at least three columns on the circumferential face, wherein the angular spacing of the cutting inserts about the rotational axis within the first row varies within the first row, and the angular spacing of the cutting inserts about the rotational axis within the second row varies within the second row and varies from the angular spacing of the cutting inserts about the rotational axis within the first row, wherein angular spacing is measured in a plane perpendicular to the rotational axis.

12. The helical end mill according to claim 11, wherein at least one cutting insert is positioned at a first rake angle, and at least one other cutting insert is positioned at a different rake angle.

13. The helical end mill according to claim 12, wherein the rake angle and the different rake angle both comprise axial rake angles.

14. The helical end mill according to claim 12, wherein the first rake angle and the different rake angle both comprise radial rake angles.

15. The helical end mill according to claim 14, wherein lead cutting inserts of different columns display radial rake angles of greater magnitude than the rake angles of at least come other cutting inserts.

16. The helical end mill according to claim 14, wherein lead cutting inserts of different columns and cutting inserts immediately adjacent to the lead cutting inserts have similar radial rake angles; and lead cutting inserts of different columns and cutting inserts immediately adjacent to the lead cutting inserts each display radial rake angles of greater magnitude than the rake angles of other cutting inserts.

17. The helical end mill according to claim 11, wherein the body has helical flutes disposed thereon, and each cutting insert is associated with one of the flutes.

18. The helical end mill according to claim 11, wherein each pocket is disposed to hold an insert such that the insert displays a clearance angle within the range of zero to twenty degrees.

19. The helical end mill according to claim 11, wherein at least one cutting insert is positioned at a first axial rake angle, and at least one other cutting insert is positioned at a different axial rake angle; and at least one cutting insert is positioned at a first radial rake angle, and at least one other cutting insert is positioned at a different radial rake angle.

20. The helical end mill according to claim 11, wherein at least one cutting insert is positioned at a first radial rake angle, and at least one other cutting insert is positioned at a different radial rake angle, and at least one cutting insert is positioned at a first axial rake angle, and at least one other cutting insert is positioned at a different axial rake angle.

* * * * *